US012181125B2

(12) United States Patent
Tanaka

(10) Patent No.: US 12,181,125 B2
(45) Date of Patent: Dec. 31, 2024

(54) DISPLAY DEVICE AND IMAGE FORMING APPARATUS

(71) Applicant: CANON KABUSHIKI KAISHA, Tokyo (JP)

(72) Inventor: Shunsuke Tanaka, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 69 days.

(21) Appl. No.: 17/989,876

(22) Filed: Nov. 18, 2022

(65) Prior Publication Data
US 2023/0199125 A1    Jun. 22, 2023

(30) Foreign Application Priority Data

Dec. 16, 2021  (JP) .................................. 2021-204610

(51) Int. Cl.
*G08B 5/36* (2006.01)
*F21S 8/00* (2006.01)
*F21W 111/00* (2006.01)

(52) U.S. Cl.
CPC ............ *F21S 8/00* (2013.01); *F21W 2111/00* (2013.01)

(58) Field of Classification Search
CPC ... F21S 8/00; F21W 2111/00; H04N 1/00496; H04N 1/0049; G03G 15/5016
USPC ......... 340/815.5, 815.4, 815.45, 815.49, 571
See application file for complete search history.

(56) References Cited

U.S. PATENT DOCUMENTS

| | | | |
|---|---|---|---|
| 10,054,898 B2 | 8/2018 | Kawai | |
| 10,345,751 B2 | 7/2019 | Kawai | |
| 11,841,643 B2* | 12/2023 | Mitsumata | G03G 15/0874 |
| 2003/0233775 A1* | 12/2003 | Klopfer | G09F 13/04 |
| | | | 40/442 |
| 2004/0062055 A1* | 4/2004 | Rozenberg | F21S 8/024 |
| | | | 362/555 |
| 2009/0262553 A1* | 10/2009 | Kim | G02B 3/0006 |
| | | | 362/621 |
| 2014/0293584 A1* | 10/2014 | Shibata | G09F 9/3023 |
| | | | 362/97.4 |
| 2016/0009510 A1 | 1/2016 | Kawai | |
| 2018/0321624 A1 | 11/2018 | Kawai | |
| 2020/0310021 A1* | 10/2020 | Ominato | G02B 6/0021 |

FOREIGN PATENT DOCUMENTS

JP  2016-020932 A  2/2016

\* cited by examiner

*Primary Examiner* — Anh V La
(74) *Attorney, Agent, or Firm* — Venable LLP

(57) ABSTRACT

A display device includes a first wall, a second wall disposed opposed to the first wall, a third wall disposed in a direction crossing the first wall and the second wall and provided with a mounting portion, a substrate disposed between the first wall and the second wall and provided with a light emitting portion, and a display portion to permit transmission of light irradiated from the light emitting portion and mounted on the mounting portion. As viewed in a direction perpendicular to a normal direction of the substrate and parallel to the first and second walls, a distance between the first wall and the second wall is shorter than a length of the substrate, and the substrate is inclined with respect to the first and second walls.

8 Claims, 7 Drawing Sheets

DISPLAY DEVICE AND IMAGE FORMING APPARATUS

FIELD OF THE INVENTION AND RELATED ART

The present invention relates to a display device and an image forming apparatus comprising a display device.

Image forming apparatuses such as printers and copiers have many parts mounted inside thereof, such as circuit boards and motors, making their configurations susceptible to being larger in size. For this reason, in order to miniaturize image forming apparatuses, for example, Japanese Laid-Open Patent Application (JP-A) 2016-20932 introduces a configuration of an image forming apparatus which is miniaturized by improving the placement location of driving parts within the apparatus, such as a low-voltage power source portion which generates a low voltage, a high-voltage power source portion which generates a high voltage, and a motor.

However, in recent years, there has been a demand to further miniaturize image forming apparatuses, prompting the miniaturization of image forming apparatuses. In this way, there is a drive to miniaturize image forming apparatuses, while display portions of display panels etc. on display devices notifying users of the state of the image forming apparatus tend to increase in size to improve visibility from a usability standpoint. For this reason, as display portions increase in size, the size of control portions which control the display portions may also increase, creating an issue in the miniaturization of image forming apparatuses.

SUMMARY OF THE INVENTION

In order to resolve the issue described above, the present invention is provided with the following configuration.

A display device comprising: a first wall; a second wall disposed opposed to the first wall; a third wall disposed in a direction crossing the first wall and the second wall and provided with a mounting portion; a substrate disposed between the first wall and the second wall, and provided with a light emitting portion; and a display portion configured to permit transmission of light irradiated from the light emitting portion and mounted on the mounting portion, wherein as viewed in a direction perpendicular to a normal direction of the substrate and parallel to the first wall and the second wall, a distance between the first wall and the second wall is shorter than a length of the substrate, and wherein the substrate is inclined with respect to the first wall and the second wall.

An image forming apparatus comprising: an image forming portion configured to form an image on a recording material; and a display device mentioned above.

Further features of the present invention will become apparent from the following description of exemplary embodiments with reference to the drawings.

DESCRIPTION OF THE EMBODIMENTS

In the following, embodiments of the present invention will be specifically described with reference to Figures.

Embodiment 1

[Image Forming Apparatus]

Figure 1:
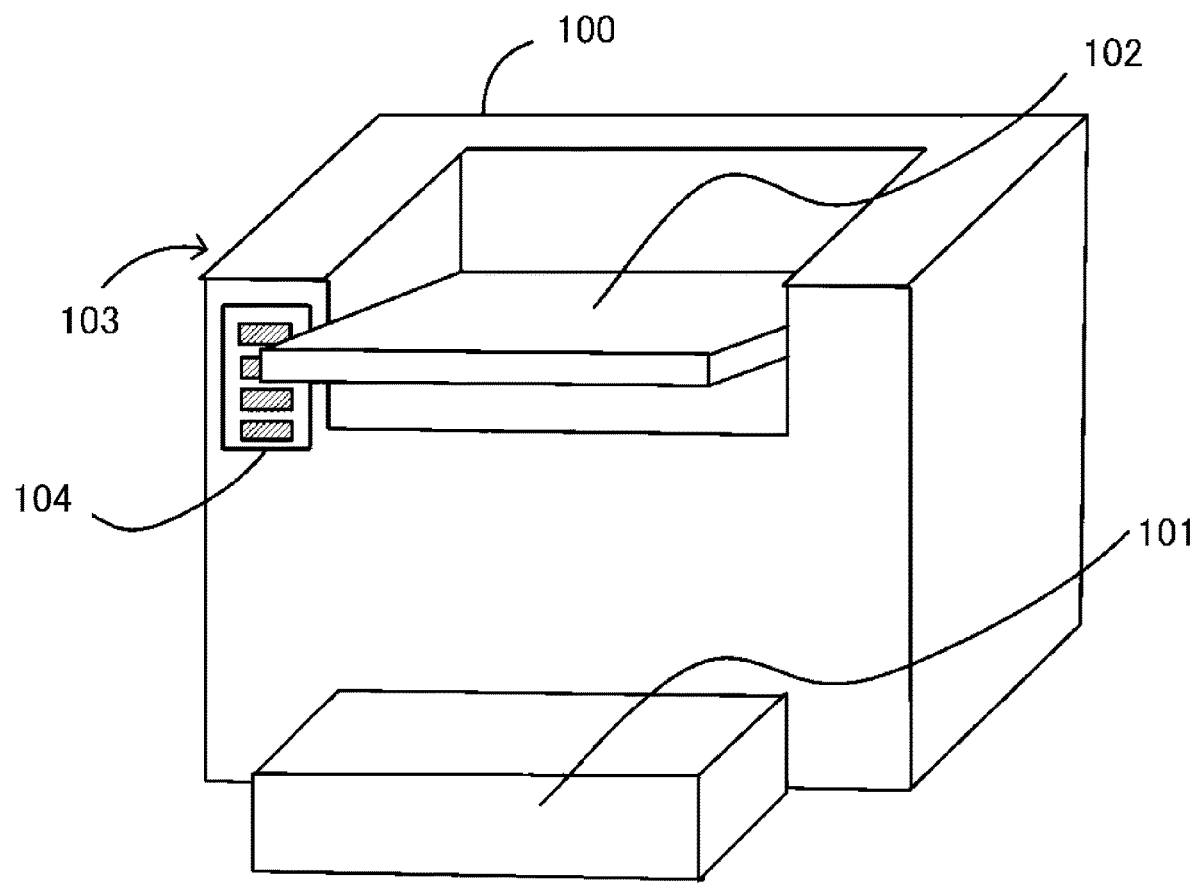
FIG. 1 is a perspective view showing an external appearance of an image forming apparatus according to embodiments 1, 2 and 3.

FIG. 1 is a perspective view showing an external appearance of an image forming apparatus on which a display device is mounted to which the present invention is applied. An image forming apparatus 100 in the embodiment 1 is a monochrome laser beam printer which uses an electronic photo process and uses developer (toner) to form an image on a recording material in response to image data sent from a personal computer or another external device. For the recording material, for example, recording paper, label paper, OHP sheets or fabric can be used. A paper feed portion 101 is provided on the bottom side of the figure of the image forming apparatus 100, wherein a recording material which forms an image is stored. When the image forming operation is started, the stored recording material is fed into the image forming apparatus 100. The image forming apparatus 100 is provided with an image forming portion, which forms an image on the recording material, inside thereof and forms an image using developer on the recording material which is fed from the paper feed portion 101. The recording material on which the image has been formed is then fed to a discharge portion 102. And the recording material to which the image has been formed is discharged to the discharge portion 102, which is provided on the top part of the image forming apparatus 100, then stacked. A display device 103, indicated by an arrow in the figure, is provided in a position that is visible to the user on the left side of the figure of the discharge portion 102. The display device 103 displays the remaining quantity of the developer, a consumable supply that is used when the image forming portion forms an image, using a display board 104 (see FIG. 2).

[Configuration of Display Board]

Figure 2:
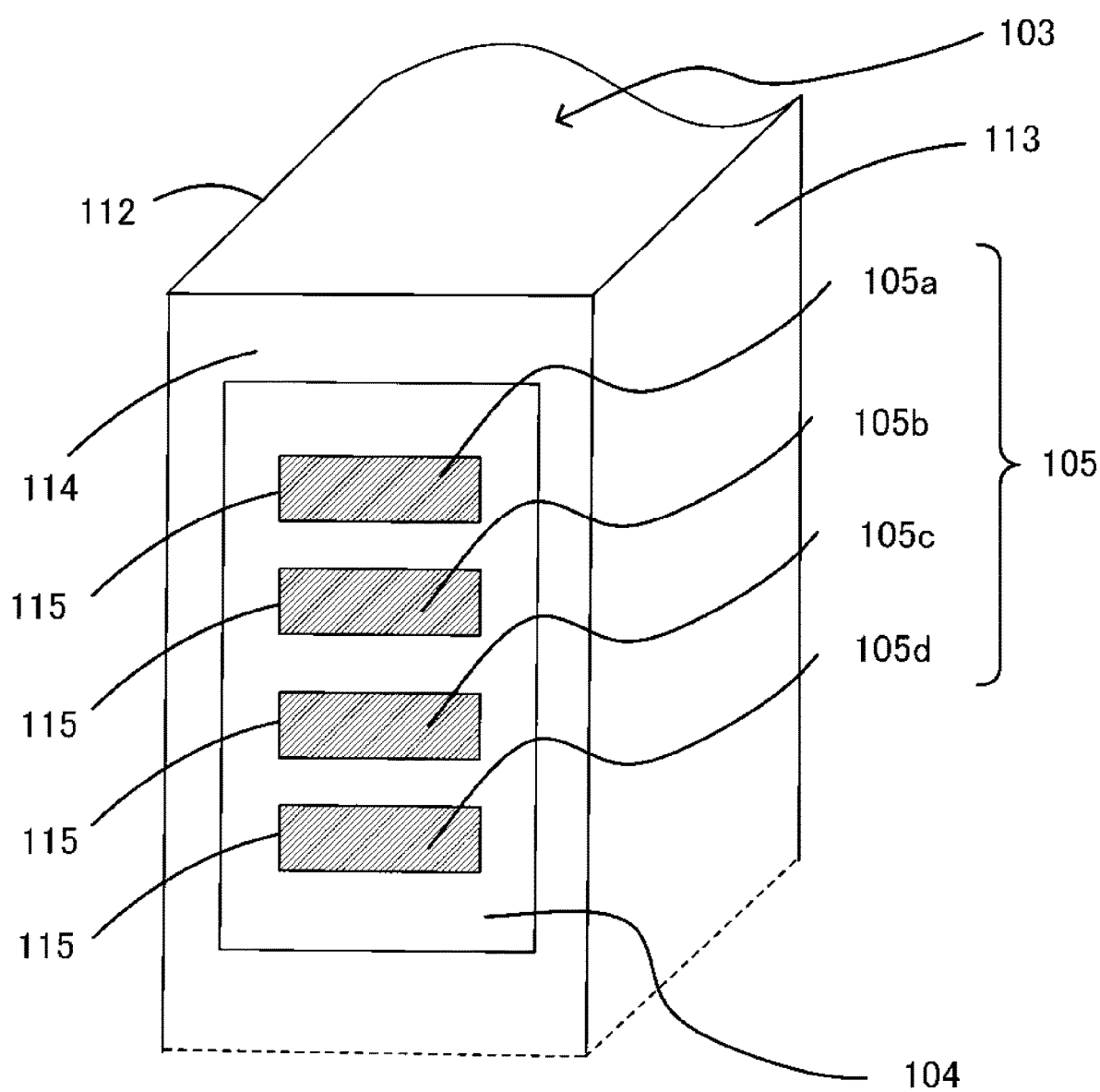
FIG. 2 is a schematic view showing a configuration of a display board according to the embodiments 1, 2 and 3.

FIG. 2 is an enlarged view of the display device 103 shown in FIG. 1. The display device 103 includes a side portion 112, which is a first wall provided on the left side of the figure, and a side portion 113, which is a second wall provided on the right side of the figure that is disposed opposed to the first wall. Further, the display device 103 includes a front portion 114, which is a third wall provided on the front side of the figure (near side) that is disposed in a direction crossing the side portions 112 and 113, and the display board 104 which is disposed on the front portion 114. Furthermore, the display device 103 includes a control substrate 106 and light emitting elements 107, which are not shown in FIG. 2 but will be described below.

Here, a plurality of openings 115, which are mounting portions for mounting display panels 105, are provided on the display board 104. The display panels 105 (105a, 105b, 105c, 105d), which are display portions that permit transmission of light irradiated from light emitting elements which will be described below, are mounted to a corresponding opening 115 on the display board 104. Incidentally, with the exception of cases referring to a specific display panel 105, the suffixes a, b, c, d will be omitted below. The control substrate 106 (not shown in FIG. 2, described below) is disposed inside the display device 103, which is enclosed by the side portions 112 and 113 and the front portion 114, and controls the display state of the display panels 105 on the display board 104.

Each display panel 105 is composed of a semitransparent diffusion material and permits transmission of irradiated light when the light is irradiated from a back surface. Because the display panels 105 emit light by the diffusion of light inside thereof, they light up in a way that appears to be lit when viewed from the front (near side in FIG. 2). On the other hand, if the light is not irradiated, the display panels 105 are unlit in a way that appears to unlit when viewed from the front (near side in FIG. 2).

The number of the display panels 105 on the display board 104 that light up changes according to the remaining quantity of the developer. Specifically, if the remaining quantity of the developer is equal to or more than 80%, 4 display portions, 105a, 105b, 105c and 105d, will be lit. Further, if the remaining quantity of the developer is equal to or more than 50% but less than 80%, 3 display portions, 105b, 105c and 105d, will be lit, while the display portion 105a will be unlit. Furthermore, if the remaining quantity of the developer is equal to or more than 20% but less than 50%, 2 display portions, 105c and 105d, will be lit, while 2 display portions, 105a and 105b, will be unlit. And if the remaining quantity of the developer is less than 20%, only the display portion 105d will be lit, while 3 display portions, 105a, 105b and 105c, will be unlit.

[Configuration of Display Device]

The purpose of the present invention is to miniaturize the display device 103 in order to reduce the size of the image forming apparatus 100. In considering the miniaturization of the image forming apparatus 100, the width of the paper feed portion 101 and the discharge portion 102 shown in FIG. 1 (the crosswise length of the figure) cannot be smaller than the width of the recording material stored in the paper feed portion 101 or the width of the recording material discharged to the discharge portion 102. For this reason, in miniaturizing the image forming apparatus 100, it is important to miniaturize the display device 103 installed to the left side of the discharge portion 102 in FIG. 1. For the image forming apparatus 100 in the present embodiment, the width of the front portion 114 of the display device 103 (the crosswise length in FIG. 2) must also be decreased in order to miniaturize the display device 103.

Figure 3:
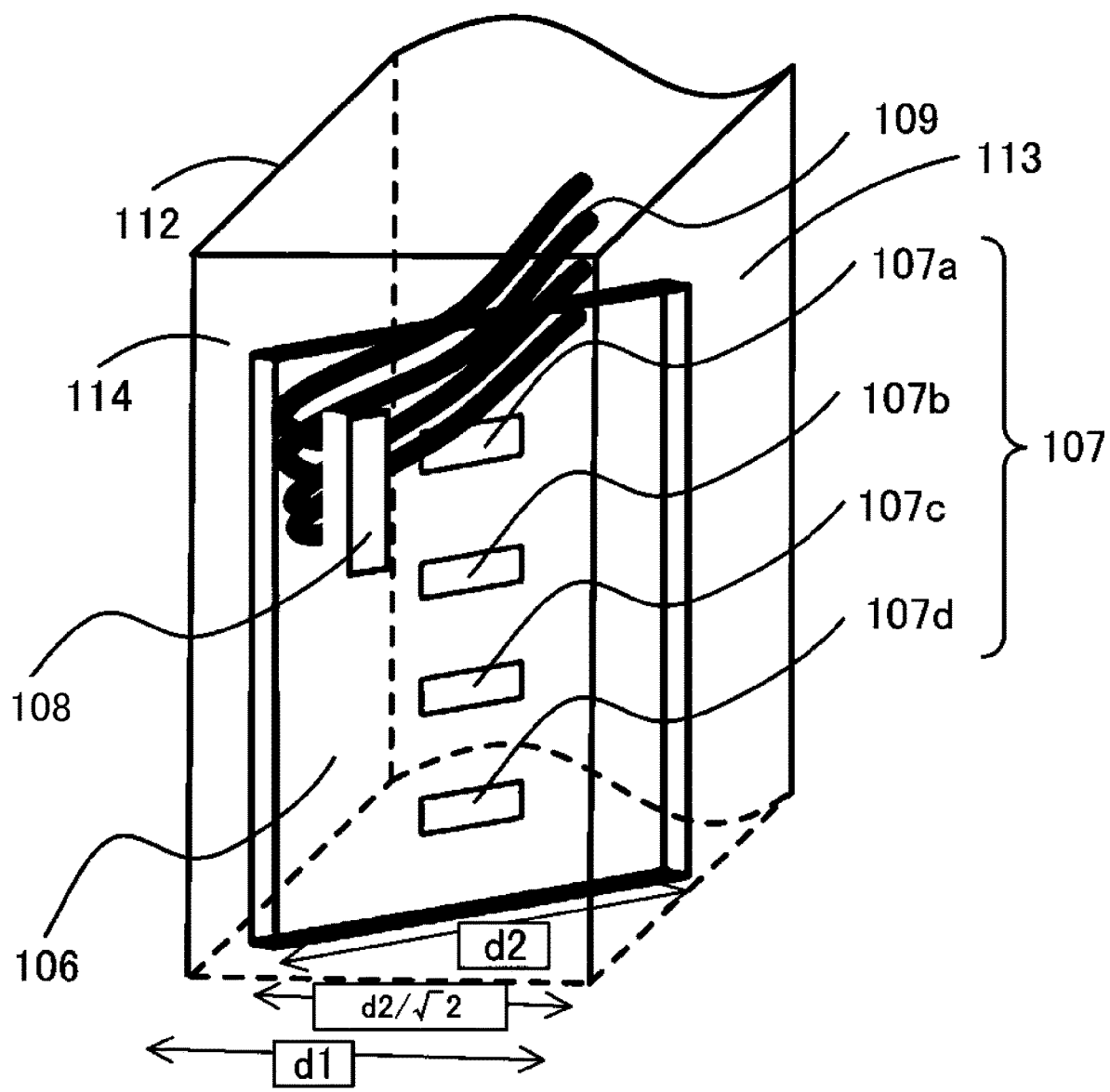
FIG. 3 is a figure illustrating a configuration of a display device according to the embodiments 1, 2 and 3.

FIG. 3 is a figure illustrating a configuration of the substrate 106 which is a control portion constituting the display device 103 in the present embodiment and controls the lighting of the display panels 105 on the display board 104. FIG. 3 is a transparent view of the display device 103 shown in FIG. 2. In FIG. 3, the display board 104 and the display panels 105 shown in FIG. 2 have been omitted.

As shown in FIG. 3, the substrate 106 is disposed between the side portions 112 and 113, behind the front portion 114 which is a space inside the display device 103. Further, in the present embodiment, the side portion 113 is a wall forming the side of the discharge portion 102 for the recording material. The light emitting elements 107 (107a, 107b, 107c, 107d), which are LEDs etc. that comprise the light emitting portion which emits light to each of the display panels 105 on the display board 104, and a peripheral circuit, which drives the light emitting elements 107, are mounted on the substrate 106. Incidentally, with the exception of cases referring to a specific light emitting element 107, the suffixes a, b, c, d will be omitted below. Circuit patterns to supply power to the light emitting elements 107 and current limiting resistors etc., which limit current flowing through the light emitting elements 107, are included in the peripheral circuit which drives the light emitting elements 107. Further, a connector 108 to connect an interface bundle wire 109 is mounted on a surface opposite to a surface of the substrate 106 on which the light emitting elements 107 are mounted. The other end of the interface bundle wire 109 is connected to the control portion (not shown in the figure) which controls the image forming apparatus 100. And a light emission instruction signal for each light emitting element 107 corresponding to the remaining quantity of the developer is then outputted from the control portion to the substrate 106 through the interface bundle wire 109, and a power supply voltage etc. which drives the substrate 106 is supplied.

The light emitting elements 107 are mounted in a position corresponding to each display panel 105, which are mounted on the display board 104, so that they can be preset to light up by irradiating light on the back surface of the corresponding display panel 105. In the present embodiment, the substrate 106 is disposed diagonally at a 45 degree angle with respect to the front portion 114 on which the display board 104 is disposed, that is, the front of the display device 103 (near side in FIG. 2) shown in FIG. 2. Further, in the present embodiment, a width d2, which is the short side direction in FIG. 3 of the substrate 106, is defined as being wider than a width d1, which is the crosswise length of the figure in FIG. 3 of the front portion 114. Here, the width of the short side direction of the substrate 106, as viewed from a perpendicular direction of the surface of the substrate 106, indicates the distance between the straight lines when the distance between the 2 parallel lines adjacent to the substrate 106 is the shortest.

In FIG. 3, the width d1 indicates the width of the front portion 114 of the display device 103, and the width d2 indicates the width of the short side direction of the substrate 106 described above. The width d1 is determined by the configuration of the image forming apparatus 100 relating to parts other than the substrate 106, and the width d2 is determined by the width of the short side direction of the substrate 106. Incidentally, the width d1 is perpendicular to a normal direction of the substrate 106 and is the distance between the side portions 112 and 113, as viewed from a parallel direction to the side portions 112 and 113.

In the present embodiment, the width d2 is presumed to be wider than the width d1. If the width d2 of the short side direction of the substrate 106 is less than or equal to the width d1 of the front portion 114, the substrate 106 can be disposed parallel to the display board 104. On the other hand, if the width d2 is wider than the width d1 and the substrate 106 is disposed parallel to the front portion 114, the width required for the display device 103 for the front direction in FIG. 3, which is the front direction of the image forming apparatus 100 shown in FIG. 1, is more than or equal to a length d2 of the short side direction of the substrate 106. In contrast, as in the present embodiment, if the control substrate 106 is disposed at a 45 degree diagonal angle with respect to the front portion 114, the width required for the front portion 114 of the display device 103 for the front direction of the display device 103 shown in FIG. 3 is more than or equal to $(d2/\sqrt{2})$ according to the Pythagorean Theorem. In the present embodiment, the size relation of the 3 widths described above is width d2>width d1>width (d2/√2), as shown in FIG. 3.

In this way, if the control substrate 106 is disposed at a 45 degree diagonal angle with respect to the front portion 114, the width of the display device 103 for the front direction of the image forming apparatus 100 can be the width d1. As a result, the width can be smaller than the width d2, which is the width when the control substrate 106 is disposed parallel to the front portion 114. Further, if the control substrate 106 is disposed at a 45 degree diagonal angle with respect to the front portion 114, the length of the depth direction of the control substrate 106 as viewed from the front of the image forming apparatus 100 is (d2/√2) according to the Pythagorean Theorem. For this reason, the length of the depth direction of the control substrate 106 can be smaller compared to the length d2 of the depth direction of the control substrate 106 as viewed from the front of the image forming apparatus 100 on the control substrate 106 when the control substrate 106 is disposed in a perpendicular direction to the front portion 114 on which the display board 104 is disposed. Further, by disposing the connector 108 on a surface opposite to a surface on which the light emitting elements 107 are mounted, miniaturization becomes possible while securing space to dispose the interface bundle wire 109.

[Brightness of Display Panels]

Figure 4:
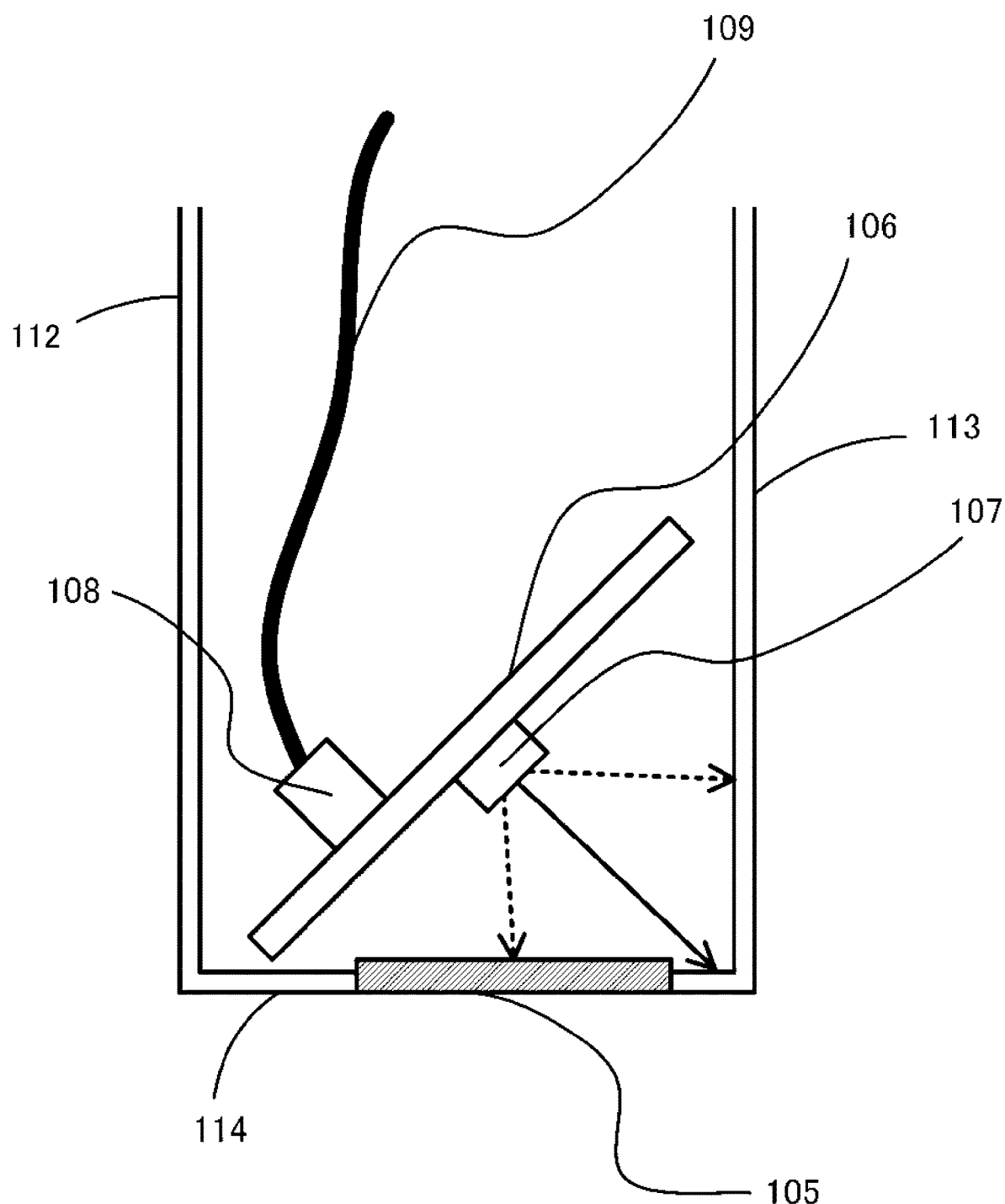
FIG. 4 is a plane view illustrating a configuration of the display device according to the embodiment 1.

FIG. 4 is a plane view of the display device 103 as viewed from the top direction in FIG. 3. FIG. 4 shows the light emitted from the light emitting elements 107, which are mounted on the control substrate 106, being irradiated to the display panels 105, which are mounted on the display board 104, as well as the interface bundle wire 109 being connected to the connector 108 on the control substrate 106. In FIG. 4, the arrow represented by a solid line indicates the light emitted from the light emitting elements 107 on the control substrate 106 in a perpendicular direction, while the arrow represented by a dotted line indicates the light emitted from the light emitting elements 107 on the control substrate 106 at a 45 degree diagonal angle with respect to a perpendicular direction.

Figure 5:
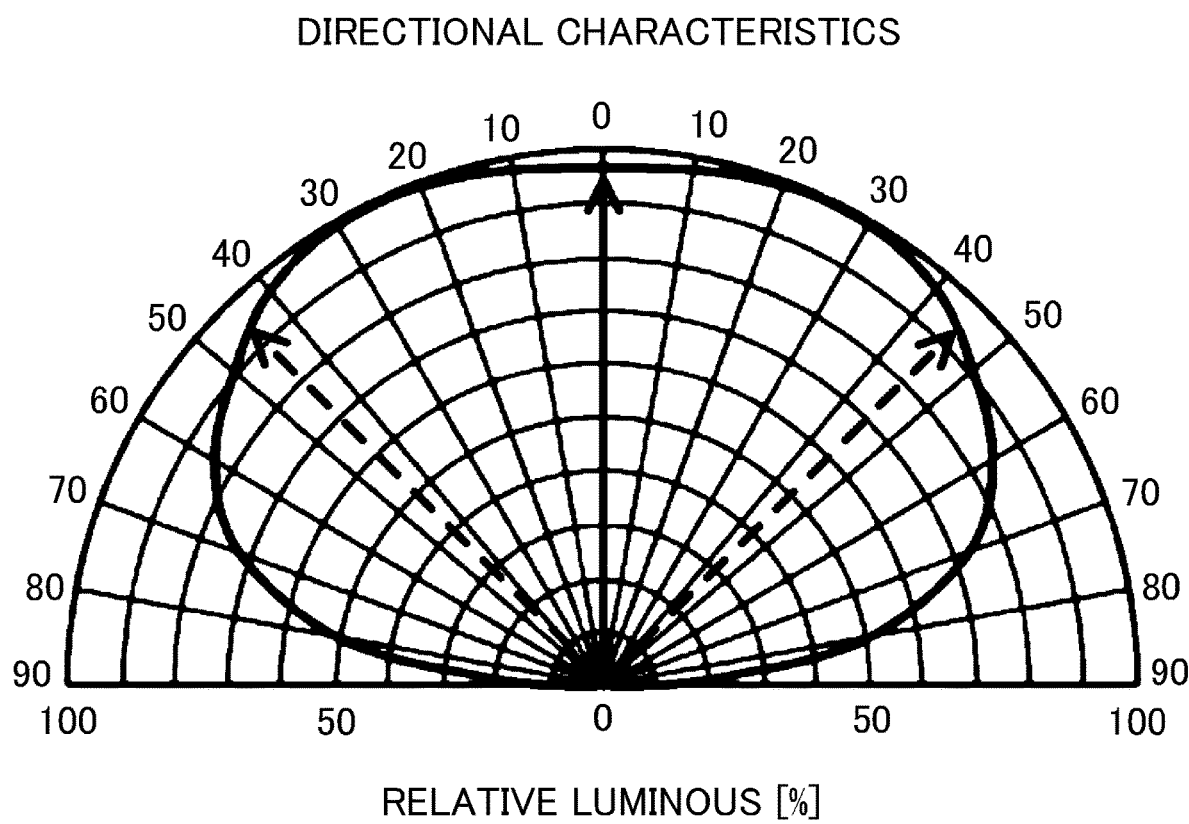
FIG. 5 is a directional characteristic view of light emitting elements according to the embodiments 1, 2 and 3.

FIG. 5 is a directional characteristic view of the light emitted from the light emitting elements 107 which are mounted on the control substrate 106 in the present embodiment. This directional characteristic view is a figure showing the relative brightness (relative luminosity) of each angle for the spread of light emitted from the light emitting elements 107, and the directional characteristic of the light emitting elements 107 is illustrated as a graph (thick solid lines) on the semicircular figure. In this directional characteristic view, the values 0, 10, . . . , 90 on the circumference of the semicircle indicate the angle of the light emitted from LEDs (unit: degrees), while the values 0, 50, 100 shown on the linear portion showing the diameter of the semicircle indicate the relative luminosity (unit: %). In this directional characteristic view, the area enclosed by thick solid lines indicates how much the brightness decreases as the angle of the light emitted from the LEDs widens, with the brightness of the brightest shining part (angle) having a relative luminosity of 100%.

In FIG. 5, the arrow represented by a solid line represents the light emitted from the light emitting elements 107 on the control substrate 106 in a perpendicular direction, while the arrow represented by a dotted line represents the light emitted from the light emitting elements 107 on the control substrate 106 at a 45 degree diagonal angle with respect to a perpendicular direction. As shown in FIG. 5, the relative luminosity of the light emitted at a 45 degree angle with respect to a perpendicular direction is approximately 95%.

For this reason, even if the control substrate 106 is disposed at a 45 degree diagonal angle with respect to the display board 104, the amount of light emitted from the light emitting elements 107 is sufficient to irradiate the display panels 105 on the display board 104, and can light up the display panels 105. On the other hand, if the control substrate 106 is disposed in a perpendicular direction with respect to the display board 104, the relative luminosity is 0% compared to in FIG. 5, and the light emitted from the light emitting elements 107 does not reach the display panels 105 on the display board 104.

As described above, by disposing the control substrate 106 at a 45 degree diagonal angle with respect to the front portion 114, the angle formed by the light emitting elements 107 on the control substrate 106 and the display panels 105 mounted on the display board 104, which is disposed on the front portion 114, is 45 degrees. As a result, the amount of light emitted from the light emitting elements 107 on the control substrate 106 entering the display panels 105 on the display board 104 remains sufficient, and can light up the display panels 105. Further, disposing the control substrate 106 at a 45 degree diagonal angle with respect to the front portion 114 makes it possible to provide the display device 103 which is miniaturized in both the width and the depth directions. Incidentally, in the present embodiment, the configuration of the control substrate 106 which is disposed at a 45 degree diagonal angle with respect to the display board 104 has been described. The angle between the control substrate 106 and the display board 104 is not limited to 45 degrees and can be any angle if the length of the short side direction of the control substrate 106, which is parallel to the width direction of the front portion 114, is less than or equal to the length of the width direction of the front portion 114. For this reason, the angle with respect to the front portion 114 of the control substrate 106 (an angle that is more than 0 degrees and less than 90 degrees) can be determined according to the length of the short side direction of the control substrate 106 and the width of the front portion 114. Further, in FIG. 3, the control substrate 106 is disposed in a position that is rotated 45 degrees with respect to the front portion 114 with the left edge of the figure as the center. However, for example, the control substrate 106 can be disposed in a position that is rotated 45 degrees with respect to the front portion 114 with the right edge of the figure as the center.

As described above, in the present embodiment, the control substrate 106 and the front portion 114 are not disposed parallel (0 degree angle) nor perpendicular (90 degree angle) to each other, but are disposed at a diagonal angle. As a result, due to the size of the control substrate 106, the increase of the length in the width direction and in the depth direction of the display device 103 can be prevented. In the present embodiment, the amount of light entering the back surface of the display panels 105 can be secured by ensuring that the disposition angle of the control substrate 106 with respect to the front portion 114 is an angle that allows a sufficient amount of light to reach the back surface of the display panels 105 due to the nature of the directivity of the light emitting elements 107. Further, in the present embodiment, the connector 108 connecting the interface bundle wire 109, whose purpose is to supply power to the control portion of the image forming apparatus 100 (not shown in the figure) and to transmit and receive control signals, is provided on the surface opposite the surface on which the light emitting elements 107 are mounted on the control substrate 106. Due to this configuration, a miniature display device 103 can be provided with space secured to dispose the interface bundle wire 109 which connects the control portion (not shown in the figure) with the control substrate 106. Incidentally, in the present embodiment, the display board 104 and the front portion 114 have flat surfaces. However, for example, the display board 104 and the front portion 114 can have curved surfaces. Further, in the present embodiment, the front portion 114 and the display board 104 are disposed in a direction crossing the first wall and the second wall, with the mounting portions provided on the third wall. However, the third wall can be constituted in this way from two or more members.

As explained above, according to the present embodiment, the display device can be miniaturized.

Embodiment 2

In the embodiment 2, a configuration will be described in which more light emitted from the light emitting elements on the control substrate reaches the display panels on the display board compared to the configuration in the embodiment 1. Incidentally, the image forming apparatus to which the display device in the embodiment 2 is applied is the same as the image forming apparatus 100 shown in FIG. 1 of the embodiment 1, therefore the same reference numerals will be used for the same configurations and explanations will be omitted. Further, for configurations of the display device 103 which are the same configurations as in the embodiment 1, the same reference numerals will be used, and explanations will be omitted.

[Configuration of Display Device]

Figure 6:
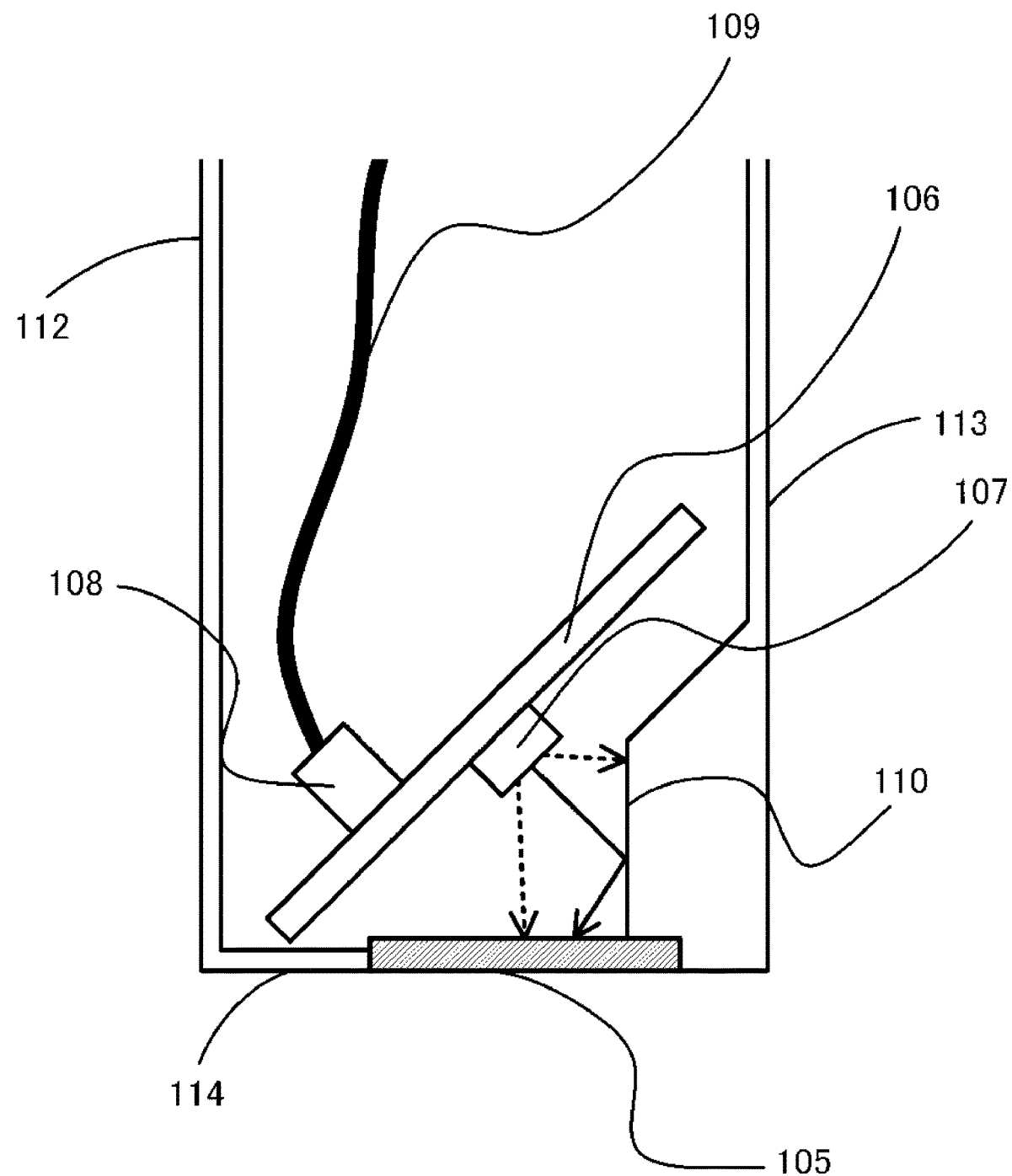
FIG. 6 is a plane view illustrating a configuration of the display device according to the embodiment 2.

As with FIG. 4 of the embodiment 1, FIG. 6 is a plane view of the display device 103 in the present embodiment as viewed from the top direction of the figure of the image forming apparatus 100 shown in FIG. 1. FIG. 6 shows the light emitted from the light emitting elements 107 mounted on the control substrate 106 being irradiated to the display panels 105, which are mounted on the display board 104, and the interface bundle wire 109 being connected to the connector 108 on the control substrate 106. As shown in FIG. 6, the control substrate 106 is also disposed at a 45 degree diagonal angle with respect to the front portion 114 in the present embodiment.

Further, in FIG. 6, the arrow represented by a solid line indicates the light emitted from the light emitting elements 107 on the control substrate 106 in a perpendicular direction, while the arrow represented by a dotted line indicates the light emitted from the light emitting elements 107 on the control substrate 106 at a 45 degree diagonal angle with respect to a perpendicular direction. In the present embodiment, the configuration is such that the light emitted from the light emitting elements 107 on the control substrate 106 in a perpendicular direction is reflected by a reflecting surface 110, which is installed on the inner wall of the display device 103 opposed to the light emitting elements 107, and reaches the display panels 105 on the display board 104. For this reason, in addition to the light entering directly from the light emitting elements 107 with respect to the display panels 105 on the display board 104 (the light represented by a dotted line in the figure), the light emitted from the light emitting elements 107 in a perpendicular direction with respect to the display panels 105 on the display board 104 and reflected by the reflecting surface 110 (the light represented by a solid line in the figure) also enters the display panels 105 on the display board 104. As a result, more light enters the display panels 105 compared to the embodiment 1 and is therefore, for example, effective when more brightness is required to light up the display panels 105, or when the light emitting elements 107 are to be configured with low luminosity products with low light output.

The reflecting surface 110 in the present embodiment is configured by a flat plane of white-mold resin, which is the material of the exterior of the display device 103, that is, the same material as the exterior of the image forming apparatus 100. In order for the light to enter the display panels 105 more effectively, for example, the reflecting surface 110 can be configured with a metallic etc. mirror plane.

As explained above, in the present embodiment, the configuration is such that, by providing the reflecting surface 110 on the inner wall inside the display device 103 which is opposed to the light emitting elements 107, the light emitted from the light emitting elements 107 is reflected by the reflecting surface 110 and enters the back surface of the display panels 105. As a result, the amount of light entering from the back surface of the display panels 105 can be increased while maintaining the miniaturization of the display device 103, allowing the display panels 105 to light up more brightly. Further, the light transmission efficiency from the light emitting elements 107 to the display panels 105 improves, allowing the use of less expensive light emitting elements with lower light output.

As explained above, according to the present embodiment, the display device can be miniaturized.

Embodiment 3

In the embodiment 3, a configuration will be explained wherein more light emitted from the light emitting elements on the control substrate reaches the display panels on the display board compared to the configuration in the embodiment 1, and wherein the incidence angle of the light entering the display panels on the display board is more uniform compared to the configuration in the embodiment 2. Incidentally, the image forming apparatus to which the display device in the embodiment 3 is applied is the same as the image forming apparatus 100 shown in FIG. 1 of the embodiment 1, therefore the same reference numerals will be used for configurations which are the same configurations as in the embodiment 1 and explanations will be omitted. Further, the same reference numerals will be used for configurations of the display device 103 which are the same configurations as in the embodiment 1 and explanations will be omitted.

[Configuration of Display Device]

Figure 7:
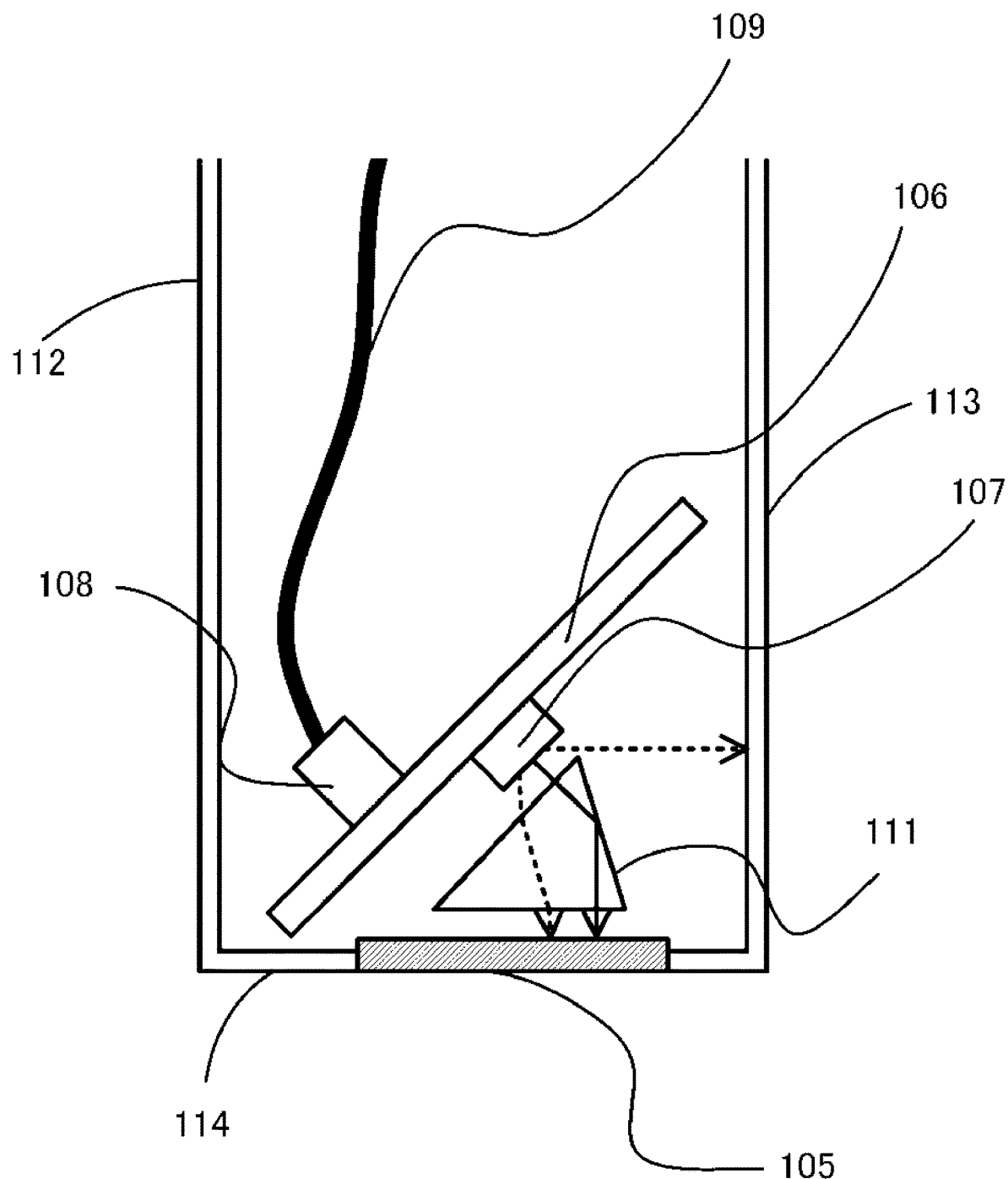
FIG. 7 is a plane view illustrating a configuration of the display device according to the embodiment 3.

As with FIG. 6 of the embodiment 2, FIG. 7 is a plane view of the display device 103 in the present embodiment as viewed from the top direction of the figure of the image forming apparatus 100 shown in FIG. 1. FIG. 7 shows the light emitted from the light emitting elements 107 mounted on the control substrate 106 being irradiated to the display panels 105, which are mounted on the display board 104, and the interface bundle wire 109 being connected to the connector 108 on the control substrate 106. As shown in FIG. 7, the control substrate 106 is also disposed at a 45 degree diagonal angle with respect to the front portion 114 in the present embodiment.

Further, in FIG. 7, the arrow represented by a solid line indicates the light emitted from the light emitting elements 107 on the control substrate 106 in a perpendicular direction, while the arrow represented by a dotted line indicates the light emitted from the light emitting elements 107 on the control substrate 106 at a 45 degree diagonal angle with respect to a perpendicular direction. In the present embodiment, the light which is emitted from the light emitting elements 107 at a 45 degree diagonal angle with respect to a perpendicular direction in the direction of the display board 104 and which enters a light guide 111, a light guide member, enters the display panel 105 corresponding to the display board 104 while being refracted on the interface of the light guide 111. Further, the light emitted from the light emitting elements 107 in a perpendicular direction enters the light guide 111 and is reflected on the inner surface of the light guide 111, then enters the display panel 105 corresponding to the display board 104. For this reason, by going through the light guide 111, the light emitted from the light emitting elements 107 enters the corresponding display panel 105 at incidence angles to the corresponding the display panel 105 on the display board 104 that are more uniform compared to the embodiments 1 and 2. When the area of the display panels 105 on the display board 104 is large, if the incidence angles of the light entering the display panels 105 are uneven, light irregularity inside the display panels 105 is more prominent. For this reason, if light irregularity is prominent, light irregularity can be prevented by using the light guide 111 to uniformize the incidence angles of the light entering the display panels 105 so that the light hits the display panels 105 uniformly.

As explained above, in the present embodiment, the configuration is such that the light guide 111 is disposed between the control substrate 106 and the display panels 105 so that the light emitted from the light emitting elements 107 is guided by the light guide 111 and irradiates the display panels 105 from the back surface. As a result, the incidence angles of the light entering the from the back surface of the display panels 105 becomes nearly uniform, preventing light irregularity of the display panels 105.

As explained above, according to the present embodiment, the display device can be miniaturized.

According to the present invention, the display device can be miniaturized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-204610 filed on Dec. 16, 2021, which is hereby incorporated by reference herein in its entirety.

What is claimed is:

1. An image forming apparatus configured to form an image on a recording material, the image forming apparatus comprising:
a first wall extending in a first direction intersecting a vertical direction, the first wall including a first end of the first wall in the first direction;
a second wall disposed opposed to the first wall, the second wall extending in the first direction, wherein the second wall includes a second end of the second wall in the first direction;
a third wall extending in the vertical direction and connecting the first end and the second end, the third wall being provided with a mounting portion;
a substrate disposed between the first wall and the second wall in a second direction intersecting the first direction and the vertical direction and provided with a light emitting portion, the substrate including a mounting surface on which the light emitting portion is provided; and
a display unit configured to permit transmission of light irradiated from the light emitting portion and mounted on the mounting portion,
wherein the second wall faces a discharging portion to which the recording material is discharged in the second direction,
wherein as viewed in the vertical direction, the substrate is inclined with respect to the first wall and the second wall,
wherein as viewed in the vertical direction, a distance between the first wall and the second wall in the second direction is shorter than a length of the substrate in a third direction, and
wherein the third direction is perpendicular to a normal to the mounting surface.

2. An image forming apparatus according to claim 1, wherein the light emitting portion includes light emitting elements,
wherein the display unit includes display portions, and
wherein each of the display portions is mounted on the mounting portion corresponding to a respectively corresponding one of the light emitting elements.

3. An image forming apparatus according to claim 2, further comprising a reflecting surface configured to reflect a light emitted from the light emitting elements to a surface where the light emitting elements oppose, and
wherein the light emitted from the light emitting elements is reflected by the reflecting surface and is irradiated to the display portions corresponding thereto.

4. An image forming apparatus according to claim 2, further comprising a light guide member provided between the substrate and the third wall, and configured to guide the light emitted from the light emitting elements to the display portions, and
wherein the light emitted from the light emitting elements is reflected on an inner surface of the light guide member and is irradiated to the display portions corresponding thereto.

5. An image forming apparatus according to claim 2, wherein the display unit further includes display panels configured to diffuse the light irradiated from a back surface of the display portions inside thereof, and
wherein the light emitting elements irradiate the back surface of the display portions corresponding thereto with the light.

6. An image forming apparatus according to claim 2, wherein the substrate is provided with a connector configured to connect a bundle wire through which a signal controlling lighting the light emitting elements is input and a power supply voltage is supplied, and
wherein the connector is disposed on a surface opposite to the mounting surface.

7. An image forming apparatus according to claim 2, wherein the light emitting elements are arranged in the vertical direction with respect to each other.

8. An image forming apparatus according to claim 1, wherein the substrate includes a first surface opposite to the mounting surface, and
wherein a direction that is normal to the mounting surface and that extends from the first surface to the mounting surface has a component of a direction from the first wall to the second wall.

* * * * *